(12) United States Patent
Duan et al.

(10) Patent No.: US 11,764,724 B2
(45) Date of Patent: Sep. 19, 2023

(54) SOLAR TRACKER WITH ORIENTABLE SOLAR PANELS ARRANGED IN ROWS

(71) Applicant: TRINA SOLAR, S.L.U, Madrid (ES)

(72) Inventors: Shunwey Duan, Jiangsu (CN); Peng Quan, Jiangsu (CN); Juan Manuel Gomez Garcia, Navarra (ES)

(73) Assignee: TRINA SOLAR, S.L.U, Madrid (ES)

( * ) Notice: Subject to any disclaimer, the term of this patent is extended or adjusted under 35 U.S.C. 154(b) by 0 days.

(21) Appl. No.: 17/690,575

(22) Filed: Mar. 9, 2022

(65) Prior Publication Data

US 2022/0329200 A1  Oct. 13, 2022

(30) Foreign Application Priority Data

Apr. 7, 2021  (ES) .......................... ES20210030703U

(51) Int. Cl.
*H02S 20/32*  (2014.01)
(52) U.S. Cl.
CPC .................................... *H02S 20/32* (2014.12)
(58) Field of Classification Search
CPC ....................................................... H02S 20/32
See application file for complete search history.

(56) References Cited

U.S. PATENT DOCUMENTS

| 8,459,249 B2 | 6/2013 | Corio |
| 10,190,801 B1 | 1/2019 | Almotlaq et al. |

FOREIGN PATENT DOCUMENTS

| CN | 205725606 | * | 11/2016 |
| CN | 205725606 U | | 11/2016 |
| CN | 110620548 | * | 12/2019 |

* cited by examiner

*Primary Examiner* — Jayne L Mershon
(74) *Attorney, Agent, or Firm* — Lucas & Mercanti, LLP

(57) ABSTRACT

A solar tracker with orientable solar panels arranged in rows, having at least two rows of photovoltaic modules (1) carrying the solar panels (2), arranged on pillars (6), the solar panels (2) mounted on respective rotation axes (3) longitudinally associated with each other by rotation transmission (5), driven by at least one motor (4) establishing the movement of all the solar panels (2) from a single actuation point, the rows of photovoltaic modules (1) related to each other by at least one transmission bar (7), joined by universal joints (8), to respective rotation transmission (5), the drive motor (4) is coupled in longitudinal alignment with respect to a transverse transmission (12) that meshes with a rotation transmission (5) and with respect to which the universal joint (8) of one end of the corresponding transmission bar (7) is joined in longitudinal alignment on the other side.

5 Claims, 9 Drawing Sheets

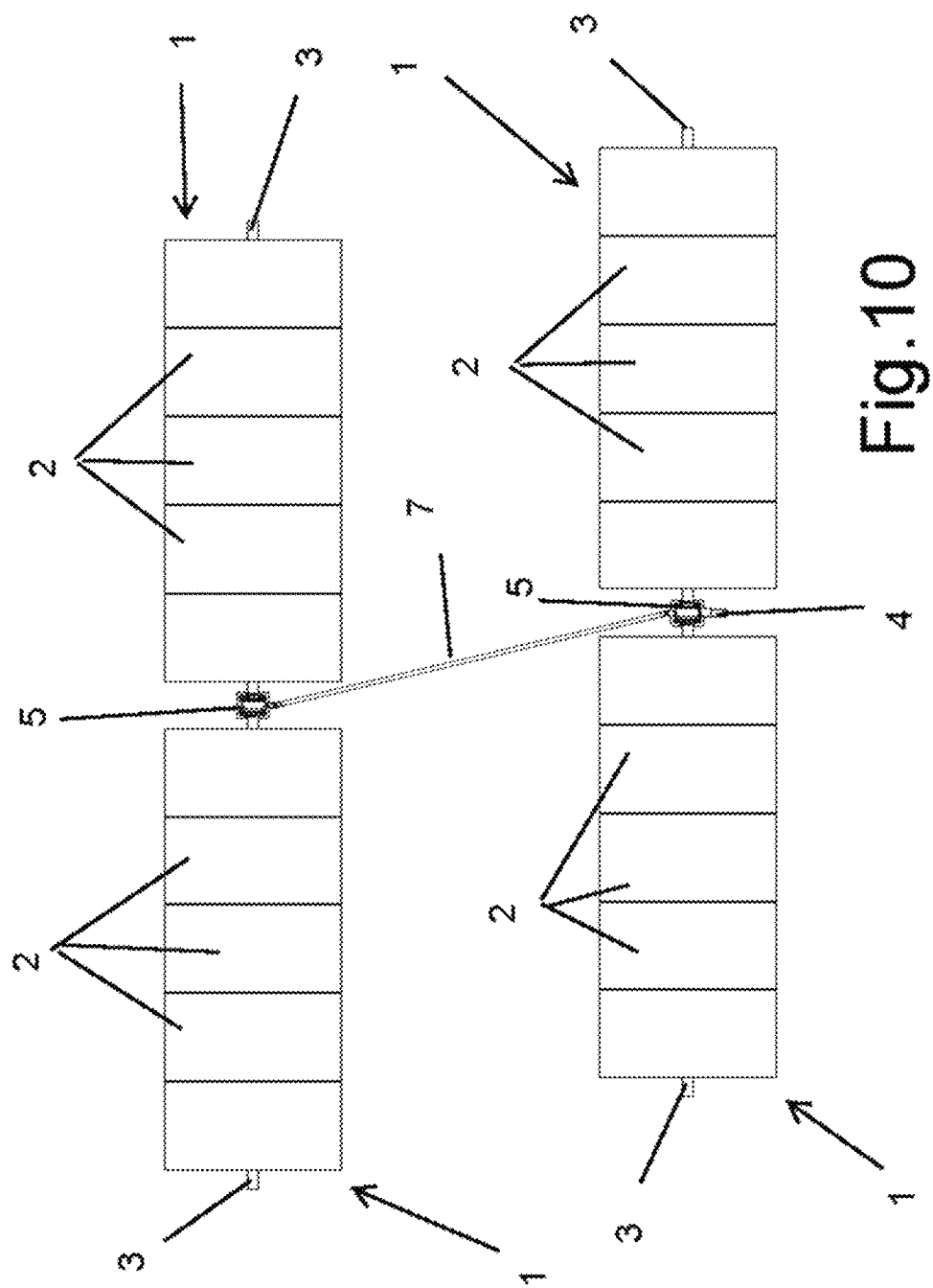

SOLAR TRACKER WITH ORIENTABLE SOLAR PANELS ARRANGED IN ROWS

CROSS REFERENCE TO RELATED APPLICATION

This application claims the benefit of priority of Spanish Patent Application No. 0202100700, filed on Apr. 7, 2021, the content of which is incorporated herein by reference.

TECHNICAL FIELD

The present invention relates to solar trackers made up of photovoltaic modules formed by frames on which solar panels are mounted, these photovoltaic modules being arranged in rows with a drive for orienting towards the position of the sun, proposing a solar tracker of this type developed with structural assembly features that improve the operational functionality and the adaptability of installation on terrains of any orography.

STATE OF THE ART

In the industry of energy production by harnessing the sun's energy, solar trackers formed by photovoltaic modules that are made up of frames on which solar panels that can be oriented towards the position of the sun are mounted are well known. There is a version of these solar trackers made up of photovoltaic modules arranged in rows, with a motorised drive for tilting about a main rotation axis, to track the movement of the sun.

The main rotation axis is a horizontal axis that is oriented in the north-south direction, such that the rotation thereof is adjusted so that the normal plane to the surface of the solar panels coincides at all times with the local meridian containing the sun.

In these already known solar trackers, each photovoltaic module is arranged on a horizontal rotation axis, so that the rotation axes of the different photovoltaic modules in one same row are longitudinally associated by means of couplings that establish a rotary transmission between them, such that it is only necessary to apply the rotation drive on one or some of the rotation axes for the entire row of photovoltaic panels to tilt together.

In addition, transmission bars are arranged between every two rows of photovoltaic modules, transmission bars which are joined to the rotation axis of each of the rows by means of rotation couplings, so that by means of a single rotational drive applied to the rotation axis of one of the rows, the simultaneous rotation of all the solar panels of the adjoining row of photovoltaic modules is established.

U.S. Pat. No. 8,459,249B2 discloses a movement transmission system almost flush with the ground wherein a motor is arranged which causes the axis to rotate, which in turn transmits the movement to slave modules. Said motor is coupled to the axis in a perpendicular or parallel manner according to the figures. This system requires a toothed arch that causes the tracker to rotate since the movement is carried out at a point which is indirectly far from it.

Chinese Utility Model CN205725606U, however, discloses a system with a transmission axis but the motor is placed parallel thereto. This makes the motor independent from the axis, but it also requires a transmission system between the motor and the axis. Since it is an indirect drive of the axis, it requires a more complex transmission system and takes up more space.

However, the orographic variety of the terrains on which the solar trackers must be installed means that there are frequent height and/or lateral deviations between the photovoltaic modules making up the rows that form the solar tracker, which entails assembling difficulties that make the installations more expensive and hinder the operating activity of the solar tracker.

For this reason, the need to develop a solar tracker with structural features that enable the installation to be adapted in a simple and practical manner to terrains of any orography, without altering the functionality of the solar tracker's operating behaviour, is evident.

It also occurs in the known solutions that the drive means for driving the transmission bars are made up of at least one motor that is arranged perpendicular to the theoretical longitudinal axis of the transmission bar that it must activate or arranged parallel to said bar, both solutions taking up a lot of space and giving rise to accidents when moving under the solar panels.

Another problem lies in the drive means for driving the rotation axis which, in addition to being complex, which reduces the reliability of the system, are arranged flush with the ground with transmission elements up to the rotation axis. This entails a two-fold problem: on the one hand, the arrangement of these drive means flush with the ground gives rise to humidity problems and even problems with flood water covering caused by heavy rains and, on the other hand, the existence of transmission elements from the flush level to the rotation axis poses a risk during the movement of the operators under the solar panels.

OBJECT OF THE INVENTION

According to the present invention, a solar tracker is proposed made up of photovoltaic modules arranged in at least two rows, with an orientable tilting drive that can be applied at a single point to drive the tilting of all the solar panels of one of the rows in a simultaneous movement and with a system of telescopic transmission bars and with a universal joint at the ends thereof to transmit the movement from one of the rows to the adjoining row, this solar tracker having been structurally developed with advantageous features for the installation assembly on terrains of any orography and with an optimal behaviour of the functional activity.

The proposed solar tracker is made up of at least two rows of photovoltaic modules, with the solar panels thereof, the solar panels of each module being arranged on a horizontal rotation axis, so that in each of the rows the rotation axes of the different photovoltaic modules are longitudinally associated by means of rotation transmission modules that transmit the rotation movement between the associated rotation axes, at least one of the rotation modules incorporating a transverse spindle and crown transmission, from which a coupling rod protrudes at least from one of the sides.

Between two adjoining rows of photovoltaic modules there is at least one transverse transmission bar, which is joined at the ends thereof, by means of universal joints, to the coupling rods of the transverse transmissions of the aforementioned rotation transmission modules; whereas a drive motor is arranged in connection with the transverse transmission of at least one of the rotation modules.

In this way, by driving with a single motor on one of the rotation modules of the solar tracker assembly, the tilting movement of all the solar panels of at least two rows of photovoltaic modules is achieved, for orientation with respect to the sun in the operation of the solar tracker.

In addition, in the installation assembly of the solar tracker, the rotation axes of the solar panels are arranged at the upper end of the pillars that are anchored to the ground and that support the frames of the solar panels of the different photovoltaic modules. The rotation transmission modules for transmitting rotation to the rotation axes are mounted on this upper end of the pillars, whereby the assembly of both the rotation transmission modules for transmitting rotation to the rotation axes and the drive motor or motors is established at a height that enables the tilting movement of orientation of the solar panels of the photovoltaic modules, without impacting the ground, being safe for the operators and without being affected by humidity or water as when they were installed flush with the ground.

The universal joints between the transmission bar and the rotation modules of the rows of solar panels are telescopic, as well as the formation of the transverse transmission bar itself, which is in turn envisaged to be longitudinally made up of independent sections joined together by a telescopic coupling.

Moreover, the rotation modules of the rows of solar panels are fastened to the support pillars by means of moorings that enable the fastening to be established at different height positions.

With all this, the transmission joint between the rows of solar panels can be extended to a variable length and the installation assembly on the supporting pillars can be adjusted in height, thus enabling assembly variables that enable the installation of the solar tracker to be adapted to terrains of different orography, with lateral deviations or deviations in height between the different anchor points of the supports.

For its part, in the formation of the solar tracker, the drive motor of the rotation axis of the solar panels is longitudinally aligned with respect to the universal joint that associates the transmission bar between rows of solar panels with the drive transmission to which said motor is coupled, with which a direct transmission of the movement of the motor to the transmission bar is obtained. This overcomes the effort required by the transmission to tilt all the plates of the solar tracker from a single drive point with greater effectiveness, at the same time that the motor is prevented from occupying the space it occupied when it was arranged perpendicularly with respect to the transmission bar associated with it or when it was parallel thereto, avoiding collision accidents with said motor.

For all these reasons, the envisaged solar tracker has some advantageous features for the installation assembly and the functioning operability, the embodiment thereof acquiring a life of its own and a preferential nature with respect to solar trackers of the same type available today.

DESCRIPTION OF THE FIGURES

FIG. 10 is a plan view of the assembly of the previous figures.

DETAILED DESCRIPTION OF THE INVENTION

Figure 1:
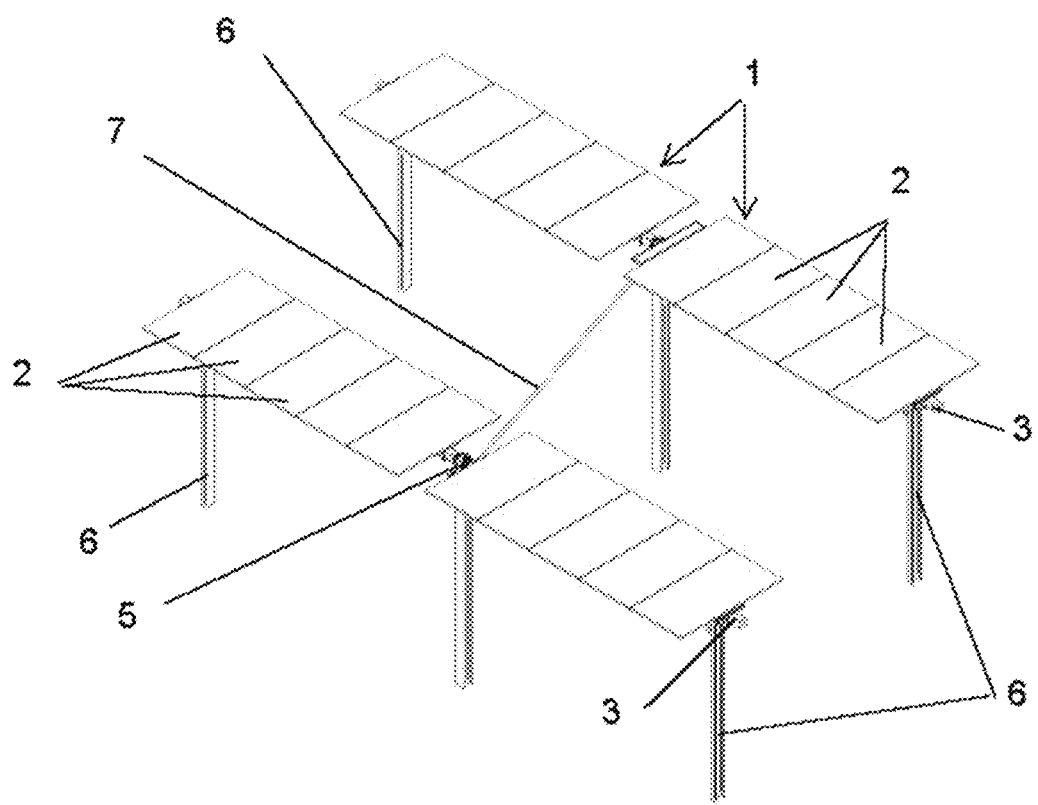
FIG. 1 shows a perspective view of a practical exemplary embodiment of the solar tracker object of the invention.

The object of the invention relates to a solar tracker formed by at least two rows of photovoltaic modules (1), each of which is made up of a series of solar panels (2) mounted on respective frames. The solar panels (2) of each photovoltaic module (1) are mounted on a horizontal rotation axis (3) that is oriented in the north-south direction, such that the rotation thereof is adjusted so that the normal plane to the surface of the solar panels (2) coincides at all times with the local meridian containing the sun.

In connection with the rotation axes (3) of a row of photovoltaic modules (1), at least one motor (4) is arranged, the driving of which results in the rotation of the horizontal rotation axis (3) associated therewith.

In each of the rows of photovoltaic modules (1) the different rotation axes (3) are associated with each other by means of rotation transmission modules (5), which are arranged on support pillars (6) for supporting the photovoltaic modules (1) that are anchored to the ground. Between two rows of photovoltaic modules (1) there is at least one transmission bar (7), which is joined at the ends thereof to respective rotation transmission modules (5), by means of universal joints (8).

Figure 2:
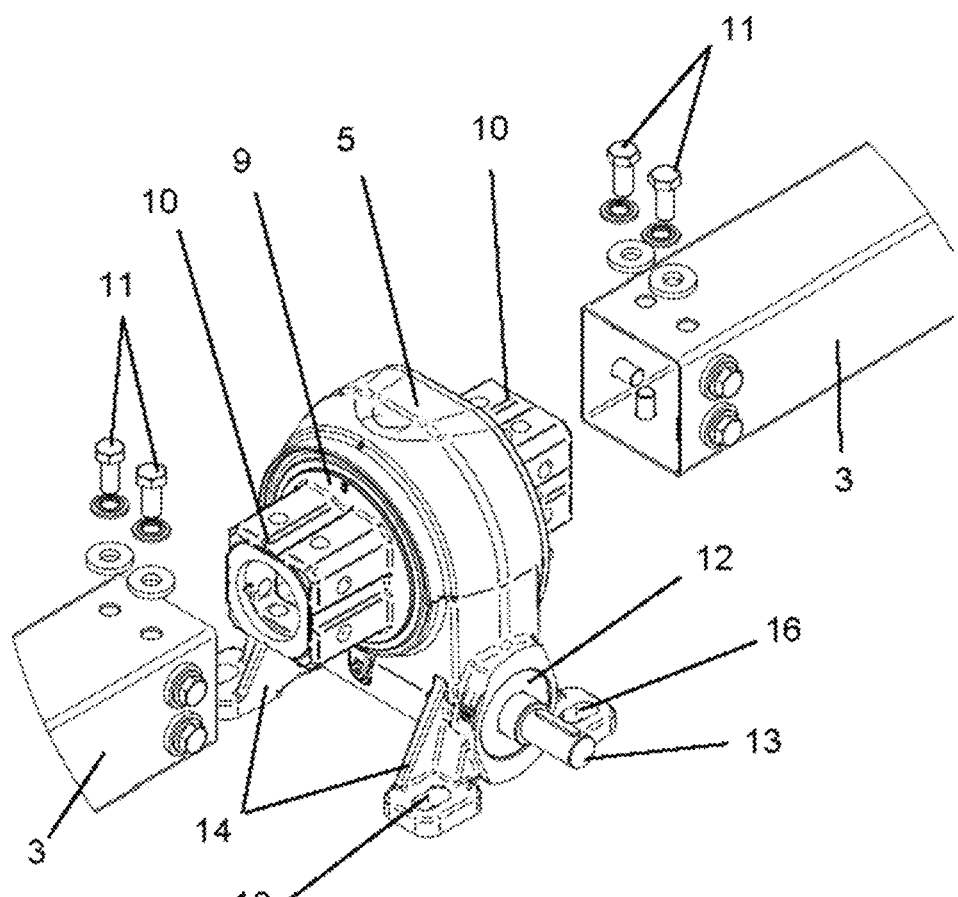
FIG. 2 is an exploded perspective detail view of the longitudinal coupling joint between two axes of solar panels in a row of the solar tracker according to the invention.

In this solar tracker formation assembly, each one of the rotation transmission modules (5) has a central core (9) arranged with a ball and socket joint set, from which trunnions (10) protrude from the sides, on which the rotation axes (3) of the solar panels (2) of the photovoltaic modules (1) adjacent to the rotation transmission module (5) are moored, by means of fitting and fastening with screws (11), as can be seen in FIG. 2, such that the rotation axes (3) joined to each rotation transmission module (5) are longitudinally associated in the corresponding row of photovoltaic modules (1) and, furthermore, in a solidary rotation assembly.

Moreover, at least one rotation transmission module (5) of each row of photovoltaic modules (1) incorporates a spindle and crown transverse transmission (12), which meshes with a central core (9) and, at least, at one of the ends it protrudes with a coupling rod (13); so that in one of said rotation transmission modules (5) the rotation drive motor (4) is arranged on one side and on the other side the universal joint (8) of one end of the transmission bar (7) is moored, while the universal joint (8) at the other end of said transmission bar (7) is moored on the transverse transmission (12) of the rotation module (5) of the other row of photovoltaic modules (1).

Thus, in a solar tracker assembly, such as the one represented in FIG. 1 or a similar one, by means of a single drive motor (4) applied to a rotation transmission module (5) of one of the rows of photovoltaic modules (1), a tilting rotation of all the solar panels (2) is achieved to orient them towards the sun, since through the transverse transmission (12) to which the drive motor (4) is coupled, the rotation of the central core (9) of the corresponding rotation transmission module (5) is driven and through the associated rotation transmission modules (5) the movement is transmitted to all the rotation axes (3) of the photovoltaic modules (1) of the same row, while through the transmission bar (7) the rotation movement is transmitted from one row of photovoltaic modules (1) to another row, thus rotating all the solar panels (2) of the tracker at the same time.

However, if due to the required drive effort a greater drive force is deemed appropriate, drive motors (4) can be arranged in connection with two or more rotation transmission modules (5) and, between the rows of photovoltaic modules (1), two or more transmission bars (7) can in turn be arranged, without altering the functional concept of the solar tracker.

Now, in the assembly arrangement, according to the invention, the drive motor (4) is arranged to be assembled on the coupling rod (13) which comes out on one side from the transverse transmission (12) on which the drive is applied, while the transmission bar (7) between the rows of photovoltaic modules (1) is moored on the coupling rod (13) that comes out on the other side of the same transverse transmission (12), whereby the drive motor (4) is longitudinally aligned with the transverse transmission (12) for applying the drive and with the universal joint (8) closest to the assembly of the transmission bar (7) between the rows of photovoltaic modules (1), thus obtaining a practically direct transmission from the drive motor (4), both to the rotation axes (3) of the photovoltaic modules (1) in the same row, and to the aforementioned transmission bar (7) between the rows of modules (1), which favours the effective harnessing of the drive force.

Figure 3:
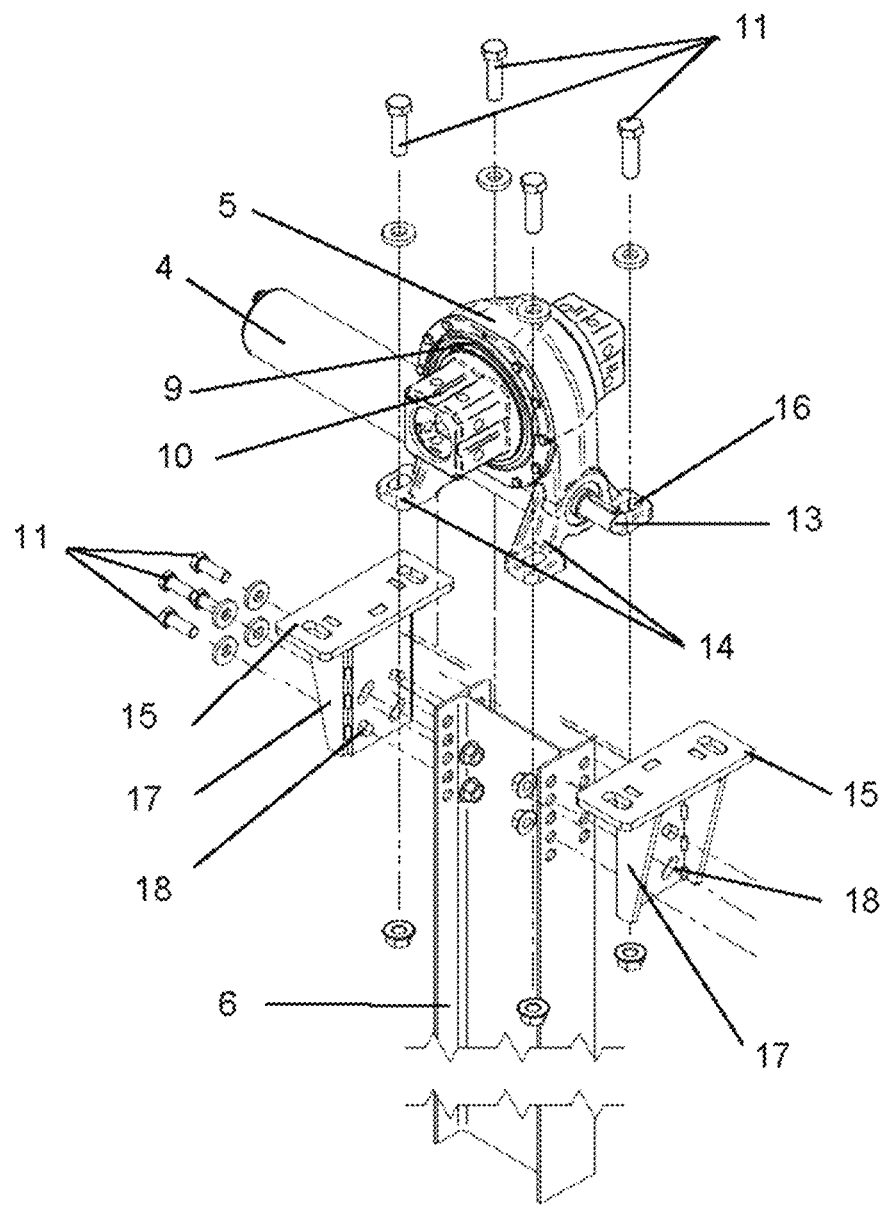
FIG. 3 is an exploded perspective detail view of the fastening assembly of a rotation transmission module of the solar tracker, which is associated with a drive motor, in the arrangement with respect to a support pillar.
Figure 4:
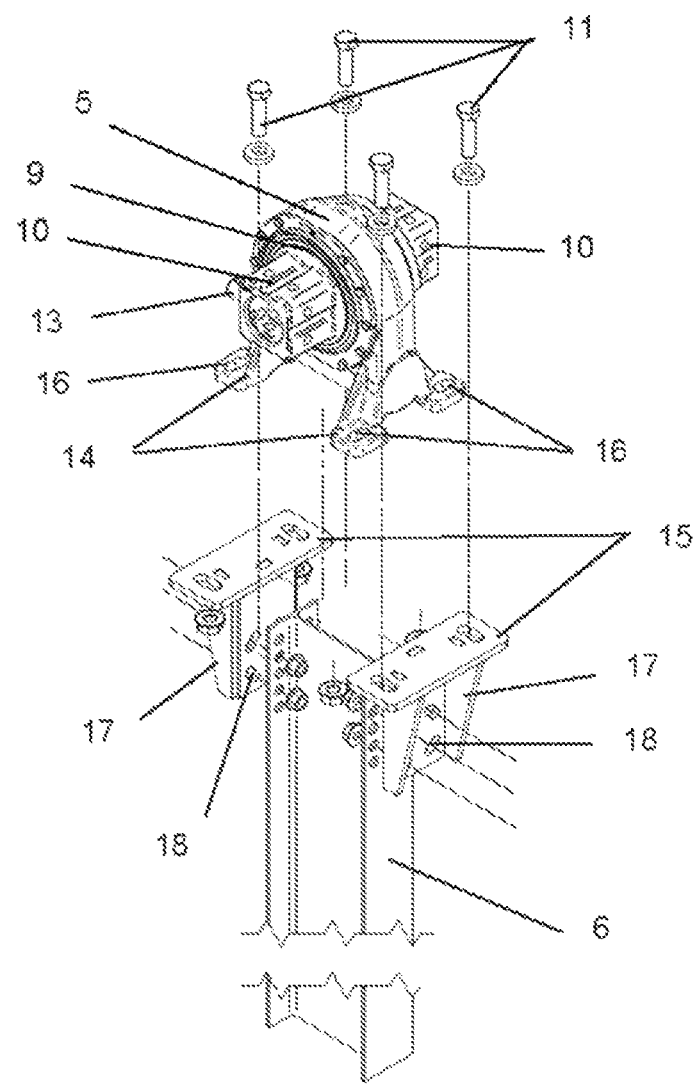
FIG. 4 is an exploded perspective detail view of the fastening assembly of a rotation transmission module of the solar tracker, which is not associated with a drive motor, in the arrangement with respect to a support pillar.
Figure 5:
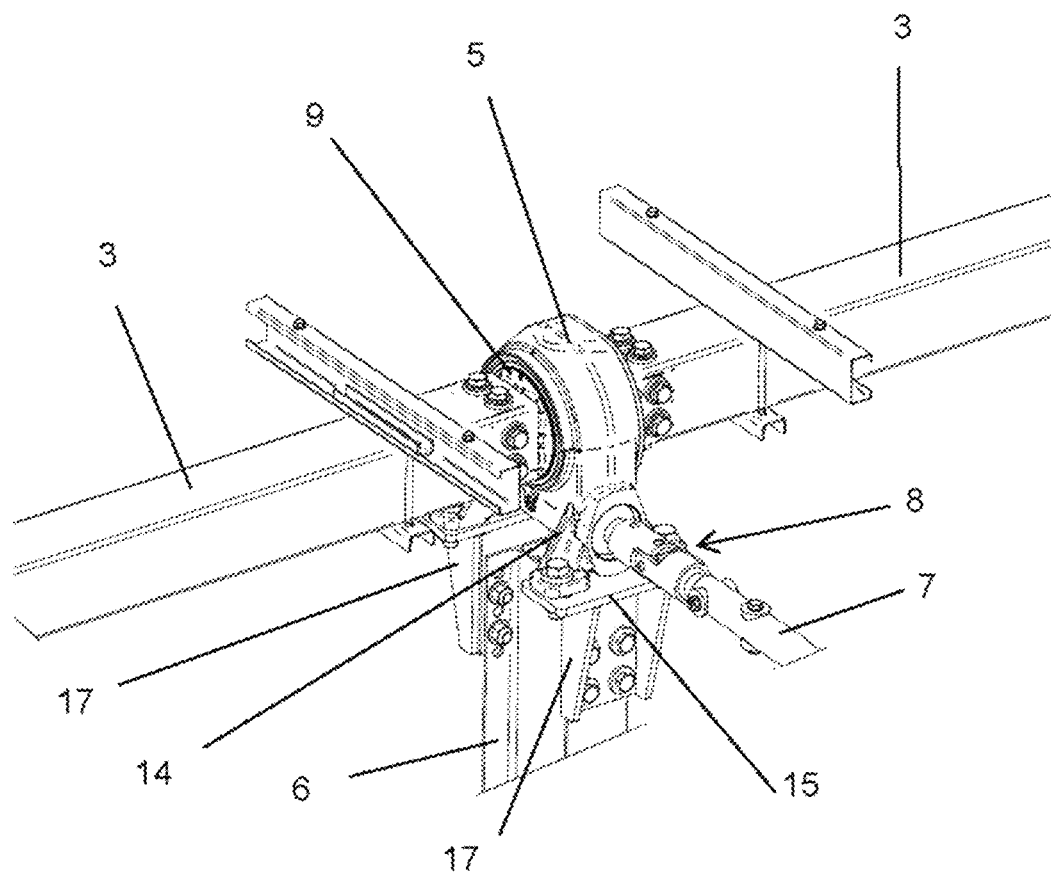
FIG. 5 is a perspective detail view of the longitudinal coupling, by means of a rotation transmission module, between two rotation axes of two adjoining photovoltaic modules in a row of the solar tracker, including the coupling on the same rotation transmission module, by means of a universal joint, of a transmission bar between the rows of solar panels of the solar tracker.

Moreover, the assembly of the rotation transmission modules (5) is established in support, by means of conformations (14) by way of legs had by the casing of said rotation transmission modules (5), these conformations (14) by way of legs being supported on trays (15), with respect to which a mooring fastening is established with corresponding screws (11), as can be seen from FIGS. 3 and 4. For the passage of the mooring screws (11), the conformations (14) by way of legs have elongated holes (16), which enable the position of the assembly on the trays (15) to be adjusted, to place each rotation transmission module (5) accurately as appropriate in the constructive formation of the solar tracker.

The trays (15), on which the rotation transmission modules (5) are supported and moored, are joined to brackets (17) with a U-shaped cross-section, which are in turn fastened by mooring by means of screws (11), on the sides of the corresponding support pillars (6), said brackets (17) for fastening the trays (15) having holes (18) for this purpose, which enable the fastening to be established at different height positions on the support pillars (6).

Figure 6:
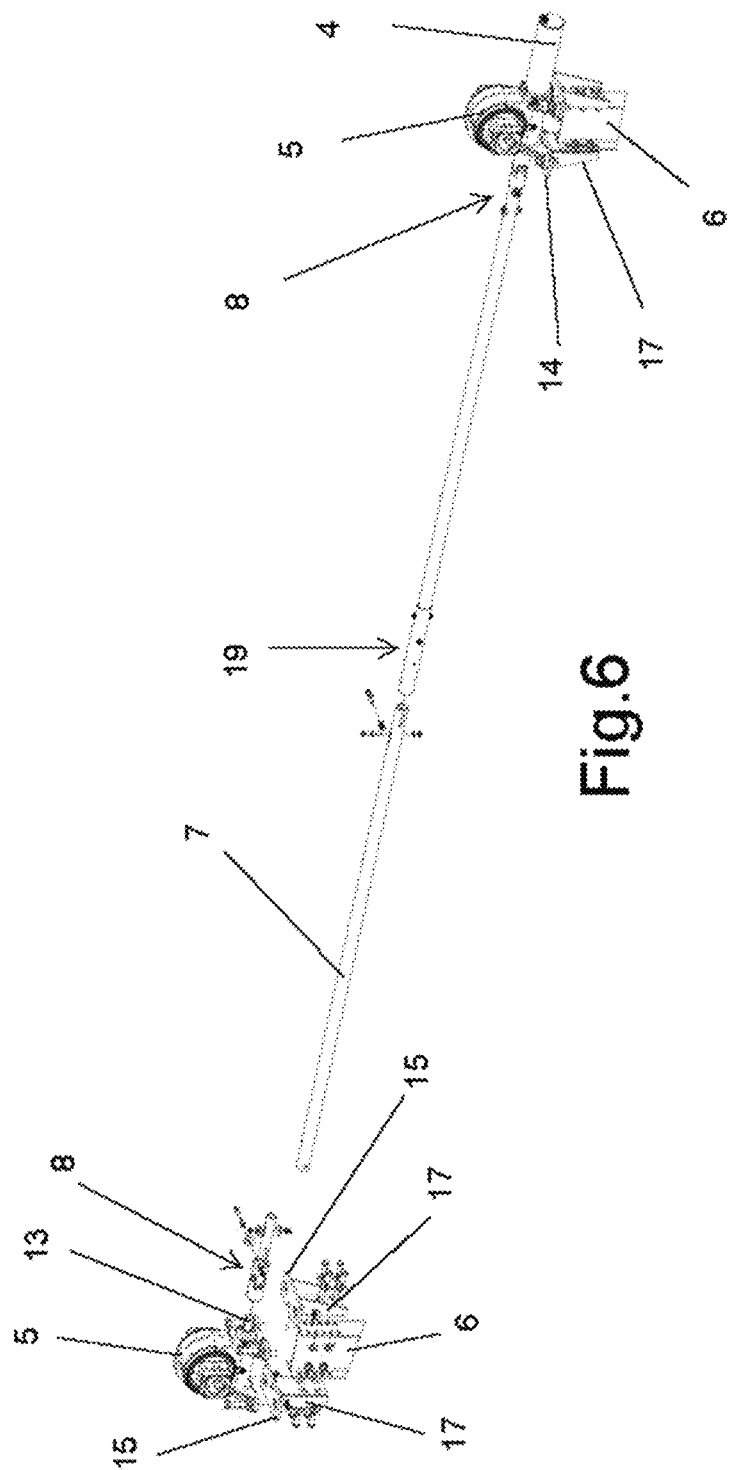
FIG. 6 is a perspective view of the transmission between rotation transmission modules of two rows of photovoltaic modules in the solar tracker, the coupling with respect to one of the rotation transmission modules being seen in an exploded representation.

In the fastening assembly of the transmission bar (7) between the rows of plates (1), with respect to the rotation transmission modules (5) between which said transmission bar (7) is arranged, the universal joints (8) by means of which the fastenings are established are arranged according to a telescopic coupling with respect to the bar (7), whereas the bar (7) itself is envisaged longitudinally made up of independent sections that are joined together by means of a coupling (19) which in turn establishes a telescopic joint, as shown in FIG. 6, whereby the transmission between the rows of the photovoltaic modules (1) can be adjusted in length to adapt the solar tracker assembly as required by the assembly of the installation in each case.

Figure 7:
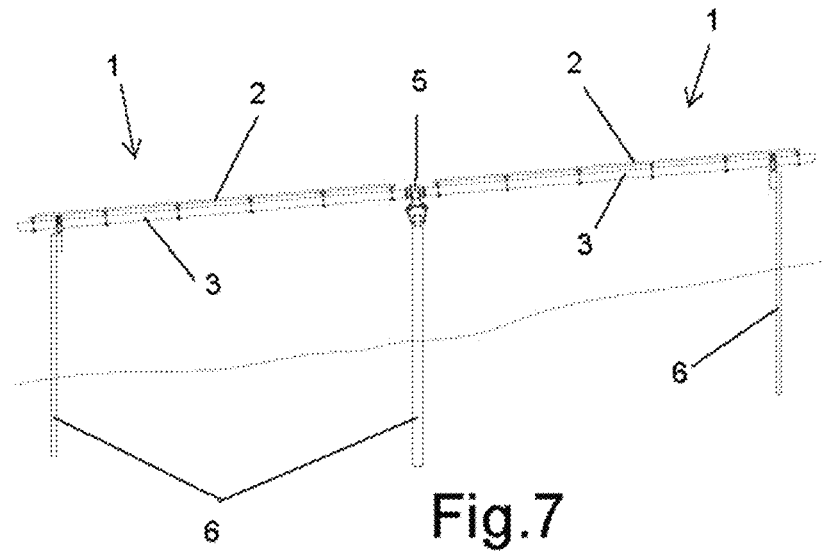
FIG. 7 is a side view of the assembly of a solar tracker, with deviation in height of the support points according to the longitudinal direction of the rows of photovoltaic modules.
Figure 8:
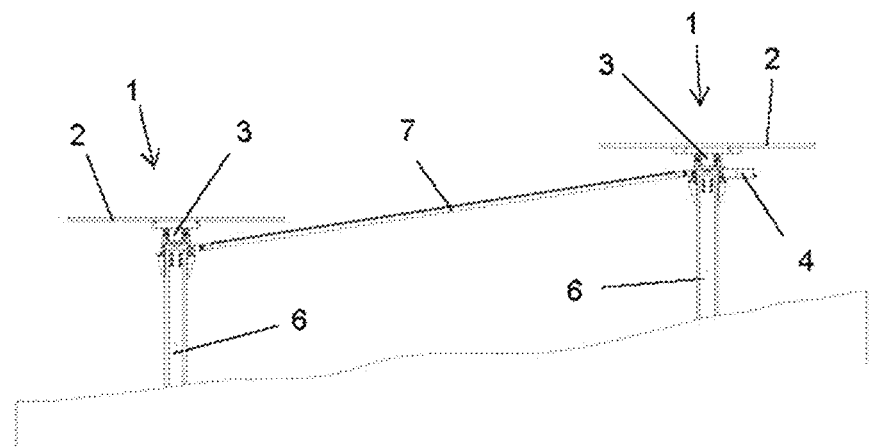
FIG. 8 is a side view of the assembly of a solar tracker, with deviation in height of the support points according to the transverse direction of the rows of photovoltaic modules.
Figure 9:
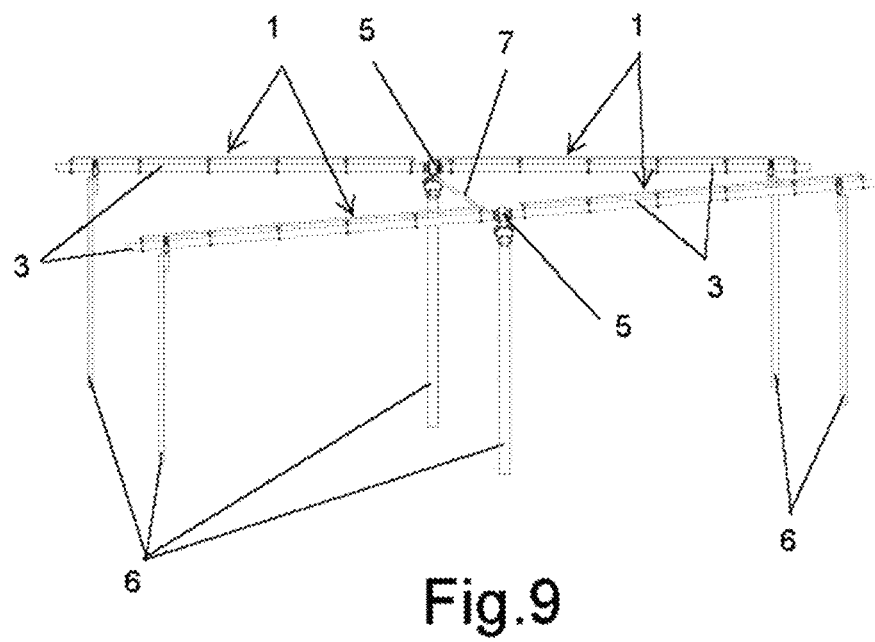
FIG. 9 is a perspective view of the assembly of a solar tracker, with deviation of the position between the rows of photovoltaic modules.

With this thus arranged, a solar tracker made up of rows of photovoltaic modules (1) carrying solar panels (2) and provided with a constructive formation according to the aforementioned features can be installed without limitations on terrain of any orography, since it enables the absorption of deviations in height in the longitudinal direction of the rows of photovoltaic modules (1), as shown in FIG. 7, as well as deviations in height in the transverse direction of the arrangement of the rows of said modules (1), as shown in FIG. 8, as deviations of the relative positioning between the rows of photovoltaic modules (1), as shown in FIGS. 9 and 10. This has a very favourable impact on the installation costs of the solar trackers, since there are no structural adaptations to be made based on the orographic shape of each installation terrain.

The invention claimed is:

1. A solar tracker with adjustable solar panels arranged in rows, comprising at least two rows of photovoltaic modules (1) carrying the solar panels (2), arranged on pillars (6) for heightened support, the solar panels (2) of each photovoltaic module (1) being mounted on respective rotation axes (3) that are longitudinally associated with each other by means of rotation transmission modules (5), driven by at least one motor (4) that establishes the movement of all the solar panels (2) from a single actuation point, the rows of photovoltaic modules (1) being related to each other by means of at least one transmission bar (7), which is joined by the ends thereof, by means of universal joints (8), to respective rotation transmission modules (5) of the respective rows of photovoltaic modules (1), wherein the drive motor (4) is arranged coupled in longitudinal alignment with respect to a transverse transmission (12) that meshes with a rotation transmission module (5) and with respect to which the universal joint (8) of one end of the corresponding transmission bar (7) is joined in longitudinal alignment on the other side, wherein the transmission bar (7) is joined to the universal joints (8) by means of telescopic couplings.

2. The solar tracker with orientable solar panels arranged in rows, according to claim 1, wherein the rotation transmission modules (5) have conformations (14) by way of legs, through which they rest on trays (15), which are arranged on the sides of the upper end of the supporting pillars (6), the conformations (14) by way of legs having elongated holes (16) which enable the position of the assembly on the support trays (15) to be adjusted.

3. The solar tracker with orientable solar panels arranged in rows, according to claim 2, wherein the trays (15) are joined to brackets (17) with a U-shaped cross-section, which are fastened on the pillars (6) by means that enable of mooring screws (11), through holes (18) of said brackets (17) the fastening to be established at different height positions.

4. The solar tracker with orientable solar panels arranged in rows, according to claim 1, wherein each rotation transmission module (5) has a central core (9) arranged in a ball and socket joint set, from which trunnions (10) protrude from the sides, on which the rotation axes (3) of the photovoltaic modules (1) adjacent to the rotation transmission module (5) are moored.

5. The solar tracker with orientable solar panels arranged in rows, according to claim 1, wherein the transmission bar (7) is longitudinally made of independent sections, which are joined together by means of a coupling (19) that establishes a telescopic joint.

* * * * *